UNITED STATES PATENT OFFICE.

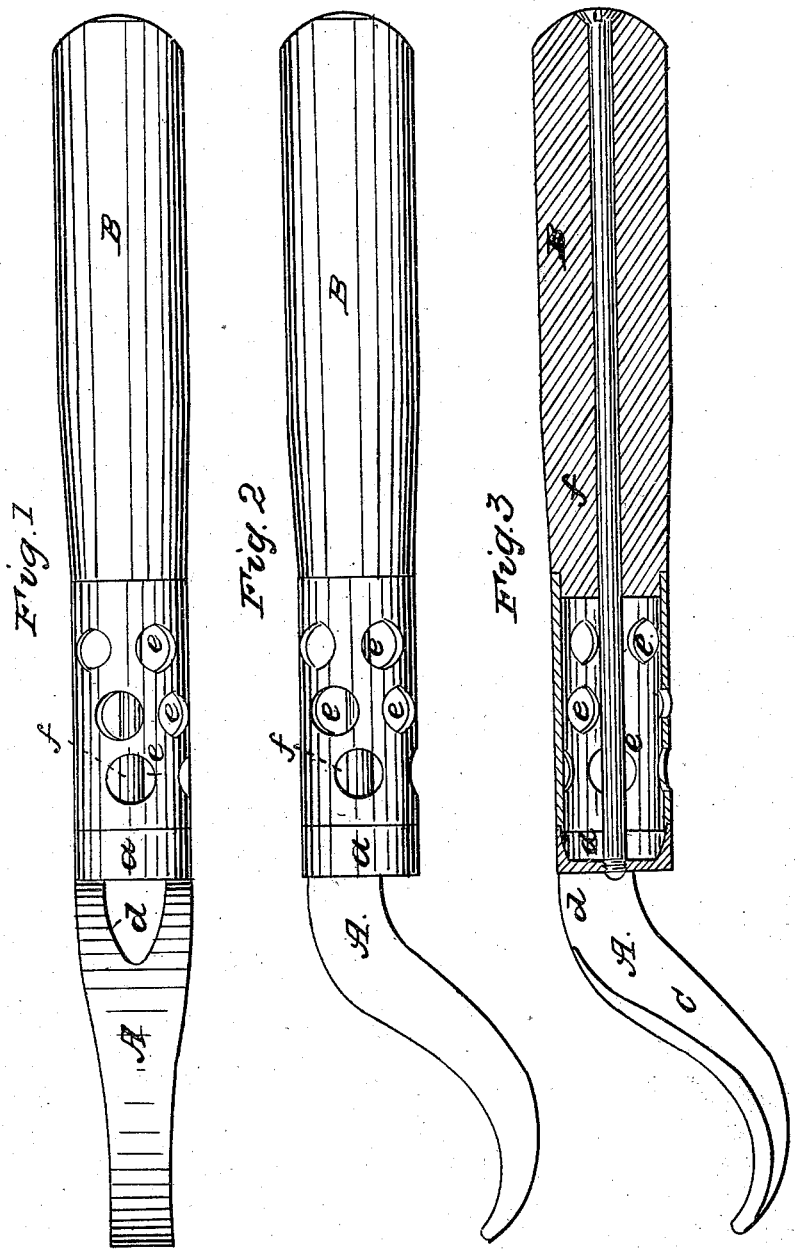

JOSEPH P. WILLIAMS, OF SOMERVILLE, MASSACHUSETTS.

IMPROVEMENT IN STOVE-COVER LIFTERS.

Specification forming part of Letters Patent No. 42,522, dated April 26, 1864.

*To all whom it may concern:*

Be it known that I, JOSEPH P. WILLIAMS, a resident of Somerville, in the county of Middlesex and State of Massachusetts, have invented an Improved Stove-Cover Lifter; and I do hereby declare the same to be fully described in the following specification, and represented in the accompanying drawings, of which—

Figures 1 and 2 are elevations, and Fig. 3 a longitudinal section, of it.

The common cover-lifter consists of a curved hook or prong projecting from a handle, which is usually either in one piece of metal with the prong or is made of wood and connected to the prong by a shank and ferrule or socket, as a common chisel is generally attached to its handle. The disadvantage of this implement when both its handle and prong are made in one piece of metal is that when in use or place on a stove or cover, the handle is apt to become too hot to be held in the hand of a person. So, when it has been provided with a wooden handle, the construction of the implement, or the application of the said handle, has been such as to render the latter liable, when in use, to become burned or more or less destroyed.

In carrying out my improvement I combine with the metallic prong, its shank or screw, and handle, in manner as hereinafter explained, a perforated tube to surround the shank or screw-rod and extend between the handle and the hook, and serve not only as a ferrule to the handle but to insulate the wooden handle from the hook in a manner to prevent destruction or injury of the handle by heat from the hook or prong. I furthermore make the body of the hook or prong grooved longitudinally on its under surface, and with an air-passage at the head of the groove and going laterally through the hook, the whole being as hereinafter explained and as shown in the drawings.

In the said drawings, A denotes the metallic hook, horn, or prong, which projects from a socketed head, $a$, formed as shown in Figs. 1 and 2, and is channeled or grooved on its under side, as shown at $c$ in Fig. 3. Close to the head $a$ there is a hole or passage, $d$, made laterally through the horn.

B is a handle, made of wood or some other good non-conductor of heat. Between the handle B and the prong or hook A is the tubular insulator, which consists of a metallic tube, perforated with numerous holes, as shown at $e\ e\ e$. One end of this tube enters and fits in the socket of the head of the prong or hook. The rear or other end of the insulator C receives the end of the handle and serves as a ferrule thereto, to prevent such handle from being split. A long shank or screw-rod goes through the handle and the insulator in the line of their axes, and screws into the head $a$, and serves to confine the handle, insulator, and hook or prong together. The air, by circulating within the insulator and into and out of its lateral passages, serves to abstract from it, as well as from the screw-rod $f$, which may be within it, the heat which they may receive from the prong or hook when it may be hot, and consequently the perforated tube C serves to prevent the handle from becoming burned by the heat of the prong. By making the prong as described—that is, with the groove $c$ and the opening $d$ arranged in it, as explained—an aerial current, while the prong may be in use, will be caused to circulate against the lower surface of the prong and pass through the opening $d$, and thereby conduct off heat from the prong, and particularly from its base, and thus prevent more or less of the heat, which would otherwise be conducted from the prong into the insulator, from passing into the latter.

I claim—

1. The combination of the perforated insulator C with the handle B and the prong A, the same being arranged and constructed substantially as described.

2. The combination of the perforated insulator C with the handle B, the prong A, and the shank or screw-rod $f$, or its equivalent, the whole being arranged as specified.

3. The prong as channeled or grooved and made with the lateral opening or passage, the same being as explained.

J. P. WILLIAMS.

Witnesses:
R. H. EDDY,
F. P. HALE, Jr.